Jan. 10, 1961

W. D. CRATER 2,967,683

APPARATUS FOR ARRESTING AIRCRAFT

Filed Feb. 24, 1959

INVENTOR:
Wilbur D. Crater

By Smyth & Roston
Attorneys

Jan. 10, 1961  W. D. CRATER  2,967,683
APPARATUS FOR ARRESTING AIRCRAFT
Filed Feb. 24, 1959  5 Sheets-Sheet 4

INVENTOR:
Wilbur D. Crater

Attorneys

Jan. 10, 1961  W. D. CRATER  2,967,683
APPARATUS FOR ARRESTING AIRCRAFT
Filed Feb. 24, 1959  5 Sheets-Sheet 5

INVENTOR
Wilbur D. Crater

United States Patent Office 2,967,683
Patented Jan. 10, 1961

2,967,683

APPARATUS FOR ARRESTING AIRCRAFT

Wilbur D. Crater, Los Angeles, Calif., assignor to Operations Research, Inc., Silver Spring, Md., a corporation of Delaware Filed Feb. 24, 1959, Ser. No. 794,992

24 Claims. (Cl. 244—110)

This invention relates to apparatus for controlling cable for such purposes as launching or arresting aircraft, missiles or the like, and has special utility for use on a runway of limited length, for example a short landing strip or the deck of a ship.

An important requirement for arresting aircraft and missiles on shipboard is, of course, reliability. It is also an important requirement that the arresting mechanism respond quickly to the original engagement transient to minimize original impact loads. A further requirement is that the mechanism apply a retarding force of the lowest possible magnitude to stop the aircraft within the available runway length. A further requisite is that the device be capable of carrying out its whole operating cycle in a short time interval, say an interval of thirty seconds, and be capable of carrying out a rapid succession of operating cycles.

In addition to these operational requisites, a number of structural requirements are important. It is highly desirable that such a mechanism for use on shipboard be relatively compact and be relatively light in weight. The construction of the mechanism should be simple and preferably highly economical. The construction should be easy to maintain and should simplify inspection.

The invention meets all of these requirements by an arrangement wherein a cable forms a normally retracted loop to be engaged by the aircraft with the portions of the cable at the opposite ends of the loop wound on non-rotating drum means. Two arms that are rotatable on the same axis as the non-rotating drum means are positioned adjacent the drum means to unwind the two cable portions, respectively, from the drum means for extension of the cable loop and to rewind the two cable portions around the drum means for retraction of the cable loop. The two arms are mounted on tubular shaft means having two opposite open ends to receive the two cable portions at the two ends respectively of the cable loop and suitable guide sheaves route the two cable portions through the tubular shaft means and to the outer ends of the two arms. Suitable brake means or energy-absorbing means is operatively connected to the two arms to resist the unwinding operation and thereby arrest the aircraft within the required distance.

It is readily apparent that the described apparatus may be fabricated for high reliability. The described structure may be of relatively low weight and may be designed to occupy relatively little space. The simplicity of the structure makes it simple to inspect and maintain.

With reference to the requirement that the mechanism respond quickly to the original engagement transient to minimize the original impact load, the important factor is the inertia of the mechanism. In this regard, a highly important advantage is that the only moving parts are the two arms, the associated structure that carries the arms and the rotary portion of the energy-absorbing means. This moving portion of the structure may be of exceptionally lightweight construction. It is an important feature of the invention that the drum means does not add to the inertia involved. It is an equally important feature that the stored or wound portion of the cable is stationary to avoid adding to the inertia involved.

As will be made apparent, the invention is highly flexible in the sense that it may take several forms to meet different installation requirements and to provide various advantages. A feature of some forms of the invention is the use of an endless cable with the special advantage that the portion of the cable that is subject to repeated wear by engagement with vehicles may be periodically shifted for distribution of the wear. A feature of other practices of the invention is the avoidance of excessive twist of the cable. The generation of twist at each end of the cable loop is inevitable, but with the twisting effects in the same rotary direction, the result is merely rolling of the cable of the loop about its own axis instead of excessive tightening or loosening of the lay of the cable strands.

Some practices of the invention provide a desirable compensating action when an aircraft makes an off-center engagement with the cable loop. Such off-center engagement tends to result in excessive stressing of one leg of the cable loop with the second leg slack. This unbalanced condition is automatically corrected by the utilization of a portion of the heavy load on the one leg of the cable for winding up the second leg to approach balancing of the loads on the two legs.

The various features and advantages of the invention may be understood from the following description taken with the accompanying drawings.

In the drawings, which are to be regarded as merely illustrative.

Figure 1:
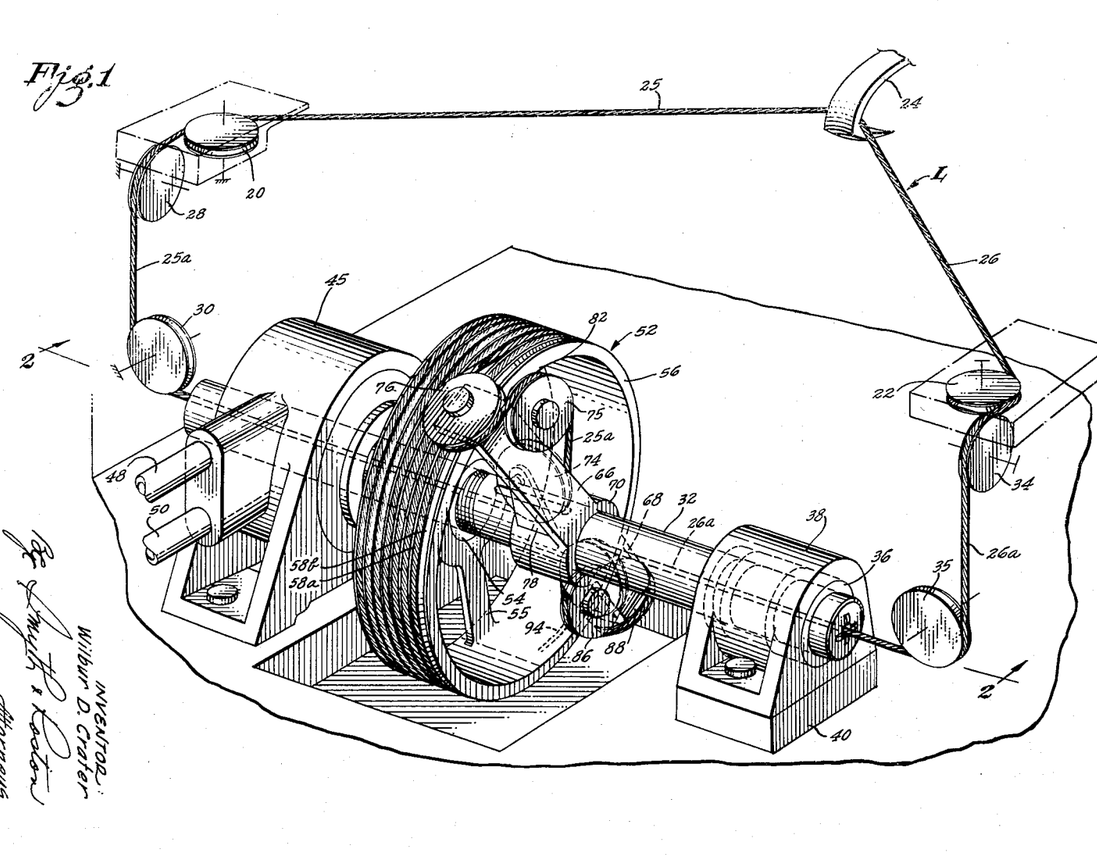
Fig. 1 is a perspective view of a first embodiment of the invention which employs a single drum with two diametrically opposite rotary arms for winding cable on a single drum.

With reference to the first embodiment of the invention, Fig. 1 shows a portion of a cable extending between two guide sheaves 20 and 22 to form a loop, generally designated L, for engagement by a hook 24 of an aircraft that is to be arrested or decelerated. The aircraft may weigh, for example, as much as 80,000 pounds and be moving at a speed of 150 to 250 knots per hour when initially engaging the loop L. The apparatus may be designed to bring the aircraft to a complete stop within a distance of approximately 200 to 225 feet.

The cable loop L which is normally retracted to a straight line between the two sheaves 20 and 22 may be regarded as comprising a left leg 25 and a right leg 26. The cable portion 25a that is continuous with the loop leg 25 passes around a pair of guide sheaves 28 and 30 that route the cable into one end of a tubular shaft 32 co-axially of the shaft. In like manner, the cable portion 26a that is continuous with the loop leg 26 is routed by a pair of guide sheaves 34 and 35 into the opposite end of the tubular shaft 32.

One end of the tubular shaft 32 may be journaled in a roller bearing 36 in a bearing housing 38 on a support block 40 and the other end may be journaled by a pair of roller bearings 42 (Fig. 2) in the housing 44 of an energy-absorbing means in the form of a rotary hydraulic pump, generally designated 45. The rotor 46 of the hydraulic pump 45 is fixedly attached to the tubular shaft 32 for rotation therewith.

As best shown in Fig. 1, the rotary pump 45 is connected to two pipes 48 and 50. The pipe 48 which normally functions as an intake pipe may be connected to a suitable supply of hydraulic fluid (not shown) and the pipe 50 which normally functions as an output pipe may be connected to a suitable reservoir (not shown) to receive the hydraulic fluid when the cable is payed out to arrest an aircraft. The required amount of energy absorption may be achieved by suitably restricting the discharge flow from the pump 45. The pump 45 is preferably of the vane type.

In this particular embodiment of the invention, the drum means comprises a single drum, generally designated 52, which is of the general construction of a wheel. The drum 52 has a hub 54 and radial spokes 55 which are integral both with the hub and with a broad rim 56. Since both of the cable portions 25a and 26a are to be wound on the single drum, the broad rim is formed with twin helical grooves 58a and 58b to receive the two cable portions respectively.

For the purpose of level winding of the two cable portions 25a and 26a on the drum 52, suitable provision is made for shift in the relative axial positions of the drum and the tubular shaft 32 in response to the rotation of the shaft. For this purpose, the hub, 54 of the drum may be formed with an internal screw thread 60 to engage an external screw thread 62 of the shaft. Thus if the shaft 32 is rotated and the drum 52 is held against rotation, the drum will shift axially along the shaft.

In this particular embodiment of the invention, any appreciable rotation of the drum 52 is prevented by the fact that the ends of the two cable portions 25a and 26a are fixedly anchored below the drum. See Fig. 2 where the ends of the two cable portions 25a and 26a are shown imbedded in a body 64 in an anchoring container 65 having overhanging walls. The anchored ends of the two cable portions make tangential contact with the drum 52 at approximately the level of the drum axis, this distance being sufficient to permit the drum to shift through the required range without inclining the two cable ends to excessive angles relative to the helical grooves in the drum.

Fixedly mounted on the tubular shaft 32 is a pair of radial arms 66 and 68 to control the winding and unwinding of the two cable portions 25a and 26a respectively. These two radial arms are integral with a common hub 70 and are in diametrically opposite positions to achieve both static and dynamic balance.

Figure 2:
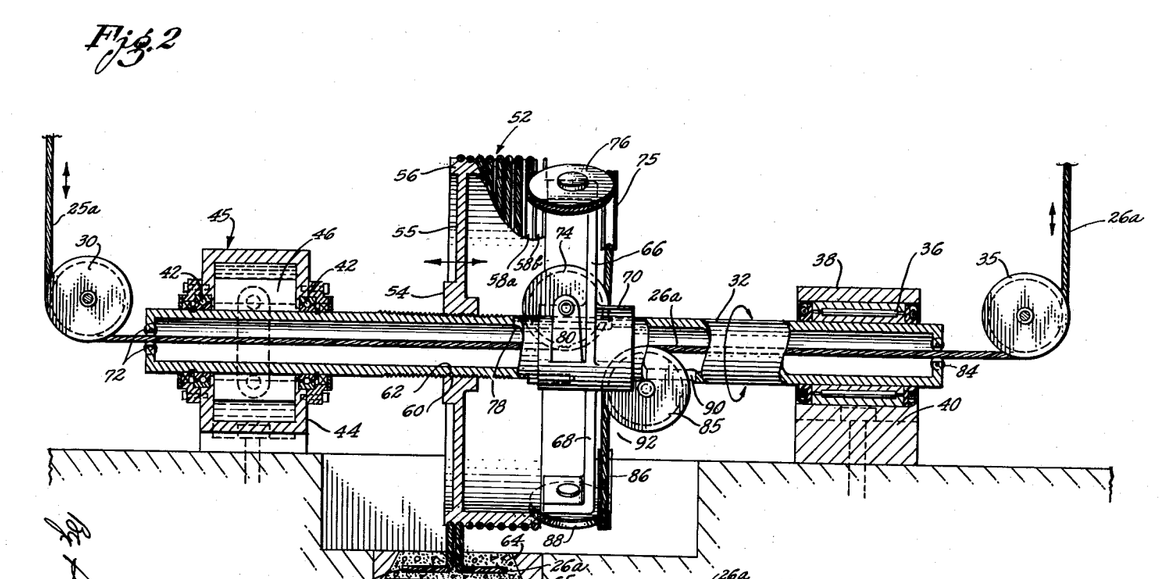
Fig. 2 is an axial sectional view of the same embodiment of the invention.

As shown in Fig. 2, the cable portion 25a extends from the guide sheave 30 though a pair of rollers 72 and along the interior of the tubular shaft 32 axially thereof to a guide sheave 74 where the cable turns radially outward to a guide sheave 75 and finally passes around an outer guide sheave 76 that overhangs the helical groove 58a on the drum 52. The guide sheave 74 is positioned in a longitudinal slot 78 of the tubular shaft 32 and is mounted on a bracket 80 that is integral with the hub 70. The sheave 75 is carried by a bracket 82 carried by the radial arm 66 and the outer sheave 76 is mounted on the outer end of the arm.

In like manner, the cable portion 26a passes from the sheave 35 through a pair of rollers 84 and through the interior of the tubular shaft 32 to a sheave 85. From the sheave 85, the cable portion 26a turns radially outward to a sheave 86 and then passes around an outer sheave 88 that overhangs the helical groove 58b on the drum 52. The sheave 85 is positioned in a longitudinal slot 90 in the tubular shaft 32 and is mounted on a bracket 92 (Fig. 2) that is integral with both the hub 70 and the arm 68. The sheave 86 is mounted on a bracket 94 (Fig. 1) and the outermost sheave 88 is mounted on the outer end of the arm 68.

The operation of this first embodiment of the invention may be understood from the foregoing description. In the normal positions of the parts when the apparatus is ready to decelerate an aircraft, the cable loop L is retracted to extend in a straight line between the two sheaves 20 and 22. At this time, only a small fraction of the cable forms the retracted loop, the major part of the cable being wound on the drum 52. When the hook 24 of a fast moving aircraft engages the cable loop L in the manner shown in Fig. 1 to extend the loop, the two cable portions 25a and 26a that are continuous with the two legs 25 and 26 of the cable loop are unwound from the nonrotating drum 52. This unwinding action causes the two arms 66 and 68 to rotate clockwise as viewed in Fig. 1 with consequent rotation of the tubular shaft 32 to drive the pump 45. The resistance to extension of the cable loop L by energy absorption on the part of the pump 45 results in bringing the aircraft to a stop within the desired run-out range.

After the hook 24 of the arrested aircraft is disengaged from the extended cable loop L, the apparatus is rotated in reverse to rewind the two cable portions 25a and 26a on the drum 52. This reverse operation to restore the parts to their normal positions may be accomplished by using the pump 45a as a fluid motor, the hydraulic fluid being forced under suitable pressure through the pipe 50 for this purpose. The whole operating cycle may extend over thirty seconds, for example, with two seconds required to arrest the aircraft, the remaining twenty-eight seconds being utilized to restore the apparatus to its normal state in preparation for immediately repeating the operating cycle.

The pitch of the screw threads 60 and 62 is commensurate with the pitch of the twin helical grooves 58a and 58b in the sense that one rotation of the shaft 32 relative to the drum shifts the drum axially relative to the shaft by a distance at least approximately equal to the width of the twin grooves. The screw threads are shown as relatively fine in Fig. 2 but multiple threads of high pitch are used, i.e., multiple threads with their turns side by side.

Figure 3:
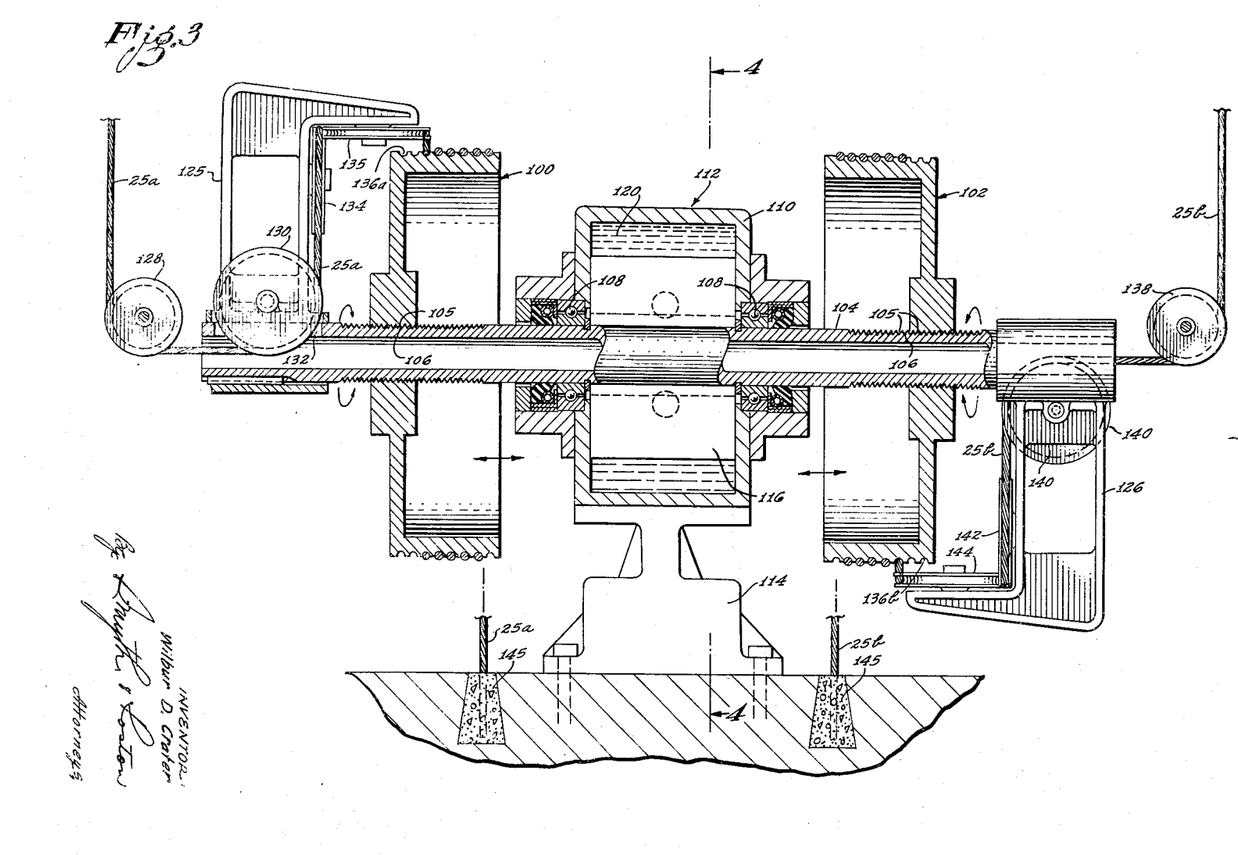
Fig. 3 is an axial sectional view illustrating a second embodiment of the invention which provides two drums and two rotary arms for winding cable thereon.
Figure 4:
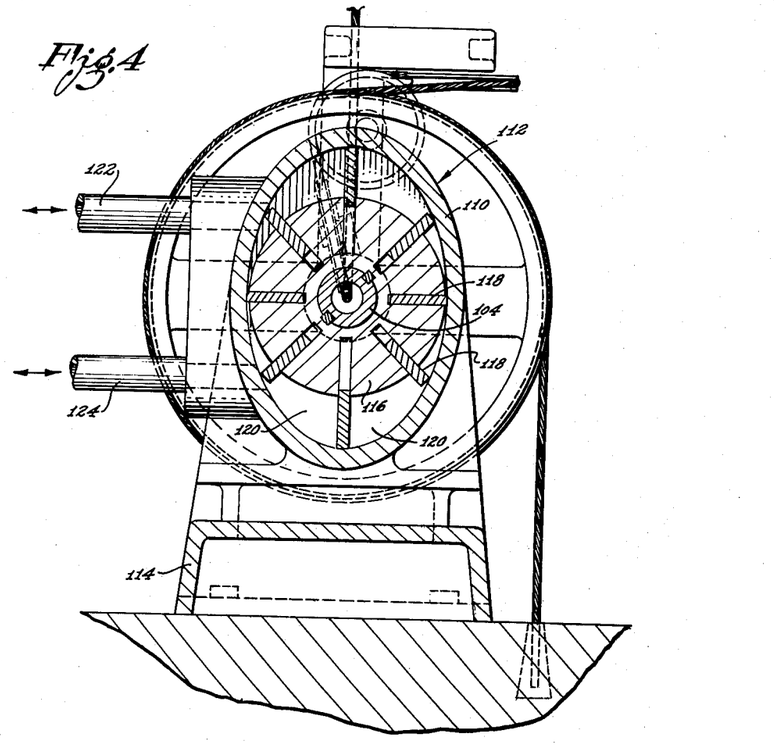
Fig. 4 is a transverse axial section taken as indicated by the line 4—4 of Fig. 3 showing the general construction of a liquid pump for dissipating energy for the purpose of the invention.

In the second form of the invention shown in Figs. 3 and 4, the drum means comprises two separate drums 100 and 102 rotatably mounted on a tubular shaft 104. In the manner heretofore described, each of the two drums 100 and 102 is internally threaded as indicated at 105, and the tubular shaft 104 is correspondingly externally threaded as indicated at 106.

The tubular shaft 104 is centrally journalled and supported by a pair of ball bearings 108 in the housing 110 of a hydraulic pump, generally designated 112. The pump 112 is mounted on a supporting base 114. As in the first described embodiment of the invention, the hydraulic pump 112 may be of the vane type. Fig. 4 shows in a simplified diagrammatic manner such a pump having a rotor 116 with a series of radially movable vanes 118, the surrounding housing 112 being oblong to cooperate with the rotor to form successive traveling pump chambers 120. The rotor 116 is keyed to the tubular shaft 104. The hydraulic pump has the usual pair of pipes 122 and 124 connected thereto, one pipe being connected to a supply of hydraulic fluid (not shown) and the other being connected to a suitable reservoir (not shown) to receive the fluid when the apparatus operates for arresting an airplane.

Fixedly mounted on the opposite ends of the tubular shaft 104 are angular radial arms 125 and 126 which are associated with the two drums 100 and 102, respectively. As heretofore described, the portion 25a of the vehicle-arresting cable passes around a guide sheave 128 to enter one end of the tubular shaft 104. Inside the tubular shaft, the cable portion 25a passes radially outward around a sheave 130 that is positioned in a longitudinal slot 132 in the tubular shaft. The cable passes around a second sheave 134 and then passes around a third outer sheave 135 that overhangs a single helical groove 136a on the drum 100. All three of the sheaves 130, 134 and 135 are rotatably carried by the structure of the angular arm 125.

In like manner, the second cable portion 25b of the cable loop passes around a sheave 138 to enter the second end of the tubular shaft 104. The cable portion 25b continues around a sheave 140 to turn radially outward to a second sheave 142 and passes from the sheave 142 to a third sheave 144, the three sheaves being carried by the structure of the arm 126. The outermost sheave 144 overhangs a helical groove 136b on the drum 102 to receive the cable portion 25b.

The two cable portions 25a and 25b extend downward from the two drums 100 and 102 respectively for fixed anchorage below the drums. For this purpose, Fig. 3 shows the ends of the cable portions 25a and 25b imbedded in suitable anchoring bodies 145.

It is apparent that this second embodiment of the invention functions in substantially the same manner as the first embodiment of the invention. One advantage of the second embodiment is in the twisting effect on the cable caused by winding and unwinding the cable from the drum means. In the first embodiment of the invention, the unwinding operation creates opposite twists in the two cable portions 25a and 25b and these opposite twists are additive in the cable loop L. In the second embodiment of the invention, however, the twists imparted to the cable portions 25a and 25b by unwinding the cable from the two drums are in the same rotary direction, the effect being merely rotation of the cable on itself in the loop L.

Figures 5, 6, 7, 8, 9, 10:
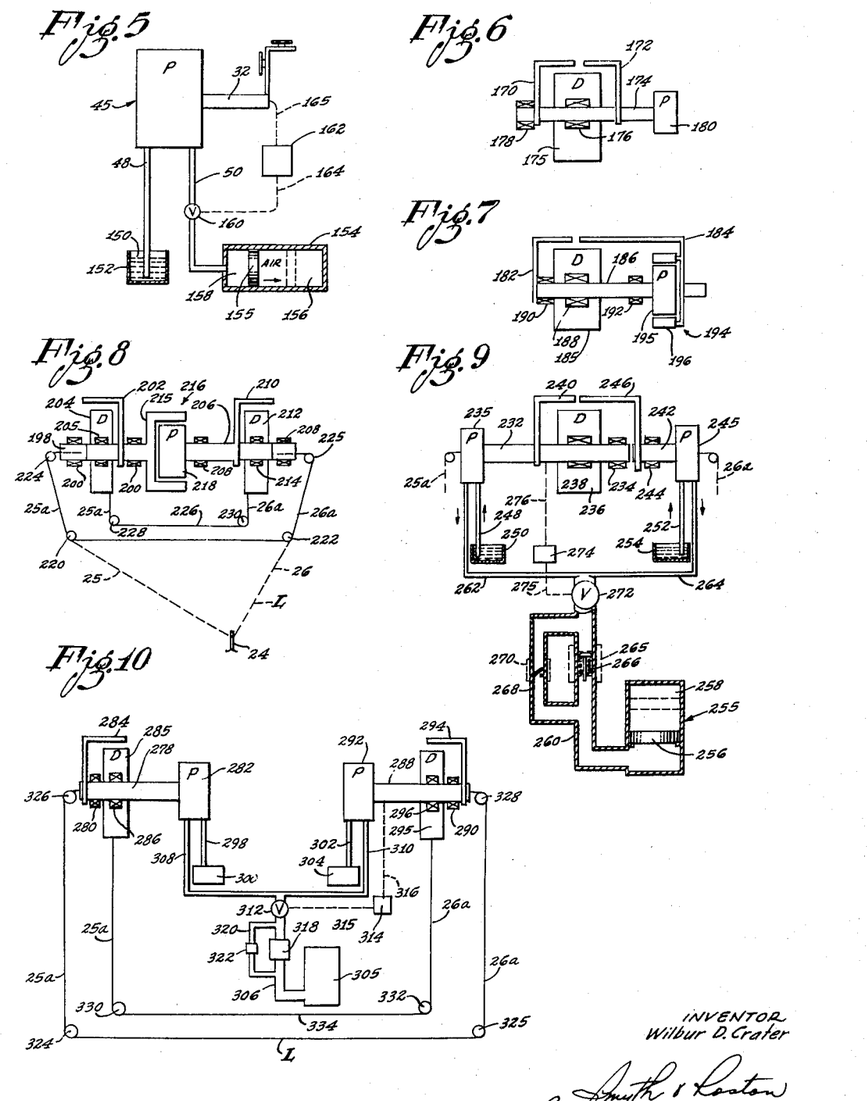
Fig. 5 is a diagram showing how an accumulator may be connected with the energy-dissipating pump to store energy for winding the cable back to its starting position.
Figs. 6 to 10, inclusive, are diagrammatic views illustrating further embodiments of the invention.

Fig. 5 shows diagrammatically how a vaned pump of the apparatus may be connected to a supply receptacle and an accumulator, the accumulator serving to store energy for the reverse or winding operation. Fig. 5 shows how the pump 45 of the first described embodiment of the invention, for example, may be connected by the previously mentioned pipe 48 to a supply of hydraulic liquid 150 in a suitable receptacle 152 and may be connected to an accumulator 154 by the previously mentioned second pipe 50.

The accumulator 154 is in the form of a closed cylinder having a floating piston 155 which divides the interior of the cylinder into an air compartment 156 and a liquid compartment 158, the liquid compartment being in communication with the pipe 50. When the shaft 32 is rotated in the course of arresting an airplane, the pump 45 withdraws hydraulic fluid from the receptacle 152 and delivers the hydraulic fluid to the accumulator 154 to drive the piston 155 and thereby contract the compartment 156 for compression of the air therein. The rewinding operation is accomplished by releasing the hydraulic fluid from the accumulator 154 to the pump 45 through the pipe 50, the pressure of the compressed air in the accumulator causing the pump 45 to function in reverse as a fluid motor for rotating the tubular shaft 32 in the cable winding direction.

Fig. 5 illustrates the further fact that a restriction may be employed in the pipe line 50 to cause the pump to absorb energy at the desired rate. In this instance, the discharge flow through the pipe 50 is restricted in a variable manner by a variable metering valve 160. In a well-known manner, the metering valve 160 is operatively connected to a control means 162, as indicated by the dotted line 164, and the control means, in turn, is operatively connected to the tubular shaft 32, as indicated by the dotted line 165. As the tubular shaft 32 is rotated in paying out the cable to the cable loop, the control means 162 responds by progressively reducing the freedom for flow through the metering valve 160. The metering valve 160 may be controlled automatically to maintain substantially constant cable tension during the arresting operation or, if desired, may be controlled for substantially constant g run-out.

Fig. 6 shows diagrammatically how two angular arms 170 and 172 may be mounted on a tubular shaft 174 to overhang a single drum 175 from opposite sides thereof. The drum 175 is rotatably mounted on the tubular shaft by a suitable bearing 176. One end of the tubular shaft 174 is journaled and supported by suitable bearing means 178 and the other end is journaled and supported in the previously described manner by bearings in the housing of a rotary hydraulic pump 180. Since the two arms 170 and 172 wind and unwind the cable from opposite ends of the drum 175, this arrangement has the same advantage as the second form of the invention in merely causing the cable loop L to roll on itself instead of adding twist to the cable loop.

Fig. 7 shows diagrammatically another arrangement in which two angular arms 182 and 184 overhang a single drum 185 from opposite ends thereof. The drum 185 is rotatably mounted on a tubular shaft 186 by a suitable bearing 188. The tubular shaft 186 is journaled and supported by two spaced bearings 190 and 192.

The tubular shaft 186 supports a rotary hydraulic pump, generally designated 194, and is fixedly connected to the rotor 195 of the pump. The angular arm 182 is fixedly mounted on the tubular shaft 186 and the second angular arm 184 is fixedly mounted on the housing 196 of the hydraulic pump. The two portions of the cable (not shown) that are controlled by the two arms 182 and 184 are wound in opposite rotary directions on the drum 185. Consequently, the paying out of the cable in the arresting of the movement of a vehicle causes the two arms 182 and 184 to operate in opposite rotary directions and the opposite rotation of the two arms causes the pump rotor 195 and the pump housing 196 to be rotated in opposite directions. It is apparent that the pump functions as an energy-absorbing means to resist paying out of the cable.

Fig. 8 shows how an endless cable may be employed instead of a cable having two ends and further shows how the invention may provide compensating action whenever the hook of an airplane engages the cable loop at an off-center location. In Fig. 8, one tubular shaft 198 journaled and supported by a spaced pair of bearings 200 carries an angular arm 202. The angular arm 202 overhangs a drum 204 that is rotatably mounted on the tubular shaft 198 by a suitable bearing 205. A second tubular shaft 206 mounted in a pair of spaced bearings 208 carries an angular arm 210 that overhangs a second drum 212. The second drum 212 is rotatably mounted on the shaft 206 by a suitable bearing 214. The first tubular shaft 198 fixedly carries the housing 215 of a rotary hydraulic pump, generally designated 216, and the second tubular shaft 206 fixedly carries the rotor 218 of the pump.

The loop L of the endless cable in Fig. 8 may be considered as comprising the usual two legs 25 and 26 which pass around corresponding guide sheaves 220 and 222. The portion 25a of the cable that is continuous with the leg 25 passes around a guide sheave 224 to enter the outer end of the tubular shaft 198 axially thereof. The cable portion 25a passes around additional sheaves (not shown) in the manner heretofore described which route the cable to the outer end of the first angular arm 202 which overhangs the first drum 204. In like manner, the portion of the cable 26a that is continuous with the leg 26 passes around a guide sheave 225 to enter the outer end of the tubular shaft 206 axially thereof. Additional sheaves (not shown) route the cable portion 26a to the outer end of the second arm 210 that overhangs the second drum 212.

The two cable portions 25a and 26a extend tangentially from the two drums 204 and 212, respectively, and are interconnected by a cable portion 226 that is continuous with the two cable portions 25a and 26a. As shown in Fig. 8, the cable portion 226 extends between two guide sheaves 228 and 230. Thus the cable is not anchored to any fixed structure whatsoever. It is to be understood, however, that the cable portion 226 may be releasably anchored to fixed structure, if desired.

When the two cable portions 25a and 26a are payed out in the extension of the cable loop L for arresting a moving aircraft, the arm 202 rotates in one direction to unwind cable from the drum 204 and the arm 210 rotates in the opposite direction to unwind cable from the drum 212. Thus the two arms 202 and 210 rotate in opposite directions to actuate the hydraulic pump 216 in the manner heretofore described.

One advantage of the embodiment of the invention shown in Fig. 8 is that the endless cable may be shifted as often as desired to distribute the wear on the cable that is caused by hook engagement with successive aircraft. For this purpose it is necessary merely to shift a portion of the cable from the winding on one of the drums to the winding on the other drum. Such a shift causes corresponding shift with respect to the cable loop L.

A second and important advantage of the arrangement shown in Fig. 8 is the manner in which the apparatus responds to the engagement of the cable loop L by an aircraft at a point that is substantially displaced laterally of the center of the loop. Fig. 8, for example, shows the hook 24 of an aircraft engaging the cable loop L at a point much closer to the guide sheave 222 than to the guide sheave 220. As a consequence of this off-center engagement, the leg 26 of the loop is placed under tension stress of relatively high magnitude and the leg 25 is placed under a substantially lesser tension load. The result is that the cable portion 26a is unwound from the drum 212 at a relatively high rate and the rotor 218 of the hydraulic pump 216 is rotated at the same high rate. The fluid coupling between the rotor 218 and the pump housing 215 tends to cause the housing to rotate in the same direction. Since this tendency for reverse rotation on the part of the housing 215 is not effectively resisted by the relatively slack cable portion 25a, the pump housing rotates in the reverse direction to cause corresponding winding rotation of the arm 202. This counter rotation of the arm 202 continues until the tension on the cable portion 25a approaches equality with the tension on the cable portion 26a. Thereafter, the two arms 202 and 212 rotate oppositely in the usual manner to resist continued paying out of the cable to the loop L.

In the embodiment of the invention shown in Fig. 9, a first tubular shaft 232 is journaled and supported at one end by a bearing 234 and at the other end by the housing of a rotary hydraulic pump 235, the shaft being keyed to the rotor (not shown) of the pump. A drum 236 is mounted on the shaft 232 by bearing means 238 and the shaft carries an angular winding arm 240 which overhangs the drum in the usual manner. A second tubular shaft 242 co-axial with the first shaft is journaled and supported by a bearing 244 and the housing of a second rotary hydraulic pump 245, the shaft being keyed to the rotor (not shown) of the pump. This second tubular shaft 242 carries an angular winding arm 246 which overhangs the drum 236 from the opposite side from the first arm. The first pump 235 is connected by a pipe 248 to a supply receptacle 250 for hydraulic fluid and, in like manner, the second pump 245 is connected by a pipe 252 to a second supply receptacle 254.

An accumulator 255 having a floating piston 256 to trap a body of air in an upper compartment 258 is connected to a main pipe 260 which has two branches 262 and 264 which are connected, respectively, to the two hydraulic pumps 235 and 245. The main pipe 260 is provided with a check valve 265 which is heavily loaded by a spring 266 to open only when the pressure on the pump side of the check valve rises to a relatively high magnitude. A pipe 268 for bypass flow around the spring-loaded check valve 265 is provided with a second check valve 270 of the conventional type which closes in response to pressure on its pump side. In addition, the main pipe 260 may be provided with a variable metering valve 272 which is operatively connected to a control means 274, as indicated by the dotted line 275. As heretofore described, the control means 274 is operatively connected to the tubular shaft 242, as indicated by the dotted line 276, to automatically vary the restriction of the flow by the metering valve 272 in response to rotation of the shaft.

The cable employed in this embodiment of the invention may be an endless cable, if desired, and the endless cable need not be anchored to fixed structure since the opposite rotation of the two arms 240 and 246 keeps the drum 236 from rotating. In the previously described manner, the cable portion 25a is routed through the tubular shaft 232 to the arm 240 for winding on the drum 236 and the second cable portion 26a is routed through the tubular shaft 242 to the second arm 246 for winding on the drum.

When the two arms 240 and 246 rotate in opposite directions in paying out the cable portions 25a and 26a for arresting the movement of an aircraft, the two pumps 235 and 245 pump hydraulic fluid through the main pipe 260 to the accumulator 255 for storing energy by compressing the air in the upper compartment 258. The metering valve 272 varies the rate of energy absorption automatically in whatever manner is desired. The check valve 265 opens readily since the pressure created in the main pipe 260 in the course of decelerating an aircraft far exceeds the resistance of the spring 266. The return rotation of the two winding arms 240 and 246 is powered by the accumulator 255 which forces the hydraulic fluid under pressure through the bypass pipe 268 back to the two pumps with the two pumps functioning as hydraulic motors.

This embodiment of the invention shown in Fig. 9 provides the same kind of compensation for the unbalanced condition that occurs when an aircraft hook engages the cable loop at an off-center point to cause one of the loop legs to be placed under high tension with the other loop leg remaining substantially slack. In the previously described embodiment shown in Fig. 8, the compensating action is accomplished by the inherent fluid coupling that exists between the rotor and stator of a rotary hydraulic pump. In the present embodiment of the invention shown in Fig. 9, the compensating action is accomplished by one pump delivering hydraulic fluid to the other pump to cause the other pump to function as a hydraulic motor.

The compensating action may be understood when it is considered that if one of the two pumps 235 and 245 is heavily loaded by high tensioning of one of the legs of the cable loop and the other pump is not loaded to a comparable degree, at least a portion of the fluid pumped by the first pump will be routed to the second pump to cause the second pump to function as a hydraulic motor with reverse rotation for winding action by the corresponding winding arm instead of unwinding action. This compensating action continues until the two legs of the cable loop approach equalized tension. The heavily loaded check valve 265 insures sufficient initial resistance to flow through the main pipe 260 to cause sufficient diversion from the highly loaded pump to the lightly loaded pump at the beginning of the arresting operation when an aircraft hook first makes contact with the cable loop.

The embodiment of the invention shown in Fig. 10 functions in the same manner as the embodiment of the invention shown in Fig. 9 but is advantageous for some installations since it permits the substitution of two widely separated drums for the single drum of Fig. 9. The arrangement may be used, for example, where it is desirable to place two winding drums on opposite sides of the deck of a ship.

In Fig. 10, a first tubular shaft 278 journaled in a bearing 280 and in the housing of a pump 282 carries an angular winding arm 274 that overhangs a drum 275, the drum being journaled on the shaft 278 by a bearing 286. In like manner, a second co-axial shaft 288 journaled in a bearing 290 and in the housing of a pump 292 carries an angular winding arm 294 that overhangs a drum 295, the drum being mounted on the shaft 285 by a bearing means 296. The pump 282 is connected by a pipe 298 to a receptacle 300 containing a supply of hydraulic fluid and the second pump 292 is connected by a pipe 302 to a second supply receptacle 304.

An accumulator 305 of the previously described type is connected to a main pipe 206 which has two branches 308 and 310 to the two pumps 282 and 292, respectively. The main pipe 306 is provided with a metering valve 312 which is operatively connected to a control 314 as indicated by the dotted line 315, the control in turn being operatively connected to the shaft 280 as indicated by the dotted line 316. The main pipe 206 also has a heavily loaded check valve 318 like the previously described check valve 265 and a pipe 320 bypassing the check valve 318 has a second conventional check valve 322.

The cable for forming the loop L extends between two guide sheaves 324 and 325. The cable portion 25a is directed into the interior of the tubular shaft 278 by a guide sheave 326 and is routed to the arm 274 for winding on the drum 275. In like manner, the cable portion 26a is directed into the tubular shaft 288 by a guide sheave 328 and is routed to the arm 294 for winding on the second drum 295.

In this instance, a continuous cable is employed but it is to be understood that the cable may have two ends fixedly anchored under the two drums 285 and 295, respectively, as heretofore described. The portion 25a of the endless cable extends from the drum 285 to a guide sheave 330 and, in like manner, the cable portion 26a extends from the drum 295 to a guide sheave 332. A cable portion 334 extending between the two guide sheaves 330 and 332 completes the continuous cable.

It is apparent that the portions of the endless cable wound on the two drums 275 and 295 may be shifted to change the portion of the cable that forms the loop L and is subject to wear by the airplane hooks. It is also apparent that if an airplane engages the loop L at a point spaced substantially from the center of the loop to place one of the cable portions 25a and 26a under excessive tension with the other cable portion relatively slack, the pump associated with the heavily loaded cable portion will drive the other pump in reverse direction to wind up the other cable portion until the loads on the two cable portions are substantially balanced.

Figure 11:
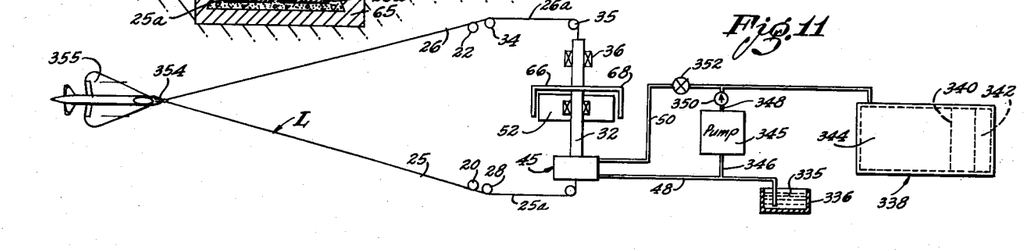
Fig. 11 is a diagram showing how the invention may be embodied in a launching apparatus.

Fig. 11 shows how the first embodiment of the apparatus shown in Figs. 1 and 2 may be adapted to launch an aircraft or missile, as distinguished from arresting an aircraft or missile. The structure indicated in Fig. 11 is largely identical with the structure shown in Figs. 1 and 2, as indicated by the use of corresponding numerals to indicate corresponding parts.

The previously mentioned pipe 48 is connected in the usual manner to a supply of hydraulic fluid 335 in a supply receptacle 336. The second pipe 50 is connected to an accumulator 338 of the type heretofore described wherein a floating piston 340 separates an air chamber 342 from a liquid filled chamber 344. A suitable pump 345 has its intake connected by a pipe 346 to the previously mentioned pipe 48 and has its output side connected by a pipe 348 to the previously mentioned pipe 50. The pipe 348 is provided with a check valve 350 and the pipe 50 is provided with a cut-off valve 352 that is located between the first rotary pump 45 and the pipe 348.

Normally the cable loop L is extended as shown for engagement, for example, by the hook 354 of an aircraft 355 so that rapid retraction of the cable loop will launch the aircraft. At this time, the accumulator piston 340 adequately compresses a suitable quantity of air in the chamber 342 to provide sufficient energy for carrying out the launching operation and the valve 352 is closed to cut off the accumulator from the rotary pump 45. The launching operation is initiated by opening the valve 352 to place the accumulator in communication with the rotary pump 45 through the pipe 50 to drive the pump in the manner of a fluid motor to drive the shaft 32 for causing the arms 66 and 68 to wind up the two cable portions 25a and 26a. After the launching operation is completed, the valve 352 is closed and the second pump 345 is energized to return the hydraulic fluid from the receptacle 336 to the accumulator to shift the accumulator piston 340 for storing energy to repeat the launching operation.

Figure 12:
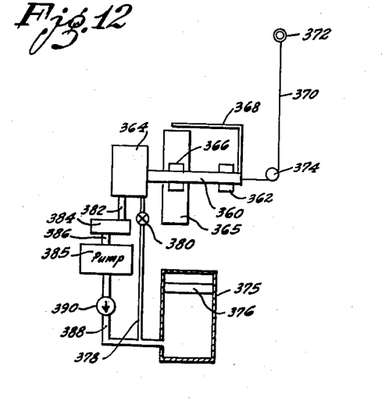
Fig. 12 is a diagram showing how the embodiment shown in Fig. 11 may be simplified to use a single run of cable for launching an aircraft.

Fig. 12 shows how the embodiment of the apparatus shown in Fig. 11 may be simplified by using only one-half of the cable loop, i.e., by winding a single run of cable on a drum means. Fig. 12 shows a tubular shaft 360 which is journaled at one end in a bearing 362 and is journaled at the other end by suitable bearings in the casing of a fluid motor 364. A non-rotating drum 365 is mounted on the tubular shaft 360 by means of a bearing 366 and the tubular shaft carries an angular arm 368 of the character heretofore described which overhangs the drum 365 to wind a cable 370 thereon. The cable 370 carries suitable means 372 at its outer end for releasably connecting the cable to an aircraft that is to be launched. The cable passes around a guide sheave 374 to enter the end of the tubular shaft 360 and is routed to the outer end of the arm 368 in the previously described manner for winding onto the drum 365.

An accumulator 375 of the previously described type having a piston 376 is connected to the input side of the fluid motor 364 by a pipe 378, which pipe is provided with a normally closed valve 380. The discharge side of the fluid motor 364 is connected by a pipe 382 to a fluid reservoir 384. A pump 385 is connected on its intake side to the reservoir 384 by a pipe 386 and on its output side is connected to the accumulator 375 by a pipe 388 that is equipped with a check valve 390.

In the normal state of the apparatus shown diagrammatically in Fig. 12, the major portion of the fluid is in the accumulator 375 with the air compressed therein for storage of energy, the cut-off valve 380 being closed. At this time, the cable 370 is fully extended. The fully extended cable 370 is connected to an aircraft 372 for the purpose of launching the aircraft. The valve 380 is then opened to place the accumulator 375 in communication with the fluid motor 364 for energization thereof. The fluid motor rotates the shaft 360 to cause the arm 368 to wind the cable on the drum 365 thereby to draw in the cable 370 rapidly for launching the aircraft. In preparation for the next operating cycle, the pump 385 is energized to transfer the fluid from the reservoir 384 back to the accumulator 375.

My description in specific detail of the selected embodiments of the invention will suggest various changes, substitutions and other departures from my disclosure within the spirit and scope of the appended claims.

I claim:

1. In an apparatus for controlling the size of a loop that is formed by a cable for temporary engagement with a vehicle, the combination of: non-rotating drum means; two portions of said cable at the opposite ends respectively of said loop to be variably wound on said drum means;

a pair of arms rotatable co-axially of said drum means adjacent thereto to wind said portions respectively on the drum means and to unwind said portions; means to route said cable portions to the region of the axis of rotation of said arms and outward adjacent the arms to points overlying said drum means; and means to control the rotation of said two arms thereby to control the size of said loop.

2. A combination as set forth in claim 1 which includes means to cause relative axial shift between said drum means and said arms for level winding of said portions of the cable on the drum means.

3. A combination as set forth in claim 1 in which said means to control the rotation of said arms comprises energy-absorbing means to arrest the movement of the vehicle.

4. A combination as set forth in claim 1 in which said means to control the rotation of said arms comprises energy source means for rotating the arms to wind said portions of the cable on the drum means for contraction of said loop.

5. In an apparatus for connection with a vehicle for the transmission of force between the apparatus and the vehicle, the combination of: a cable forming a loop for engagement by the vehicle; non-rotating drum means to be variably wound with portions of said cable at the opposite ends respectively of said loop, said cable being continuous whereby the cable may be shifted periodically to change the loop-forming part of the cable for distribution of the wear on the cable by the vehicle; a pair of arms rotatable co-axially of said drum means adjacent thereto to wind said portions respectively on the drum means and to unwind said portions; means to route said cable portions to the region of the axis of rotation of said arms and outward adjacent the arms to points overlying said drum means; and means to control the rotation of said two arms thereby to control the size of said loop.

6. In an apparatus to arrest an aircraft or the like, the combination of: a cable forming a normally retracted loop to be engaged by the aircraft; a substantially non-rotating drum means to be wound variably with the cable at opposite ends of said loop; a pair of arms rotatable co-axially of said drum means adjacent thereto; tubular shaft means carrying said arms and having two opposite ends to receive portions of said cable at the two ends of said loop respectively; rotary means to guide said portions of the cable through said tubular shaft means to said arms and to points at the outer ends of the arms overhanging said drum means whereby extension of the retracted loop by an aircraft rotates said pair of arms to unwind the cable from the drum means; and energy-absorbing means to oppose the rotation of said arms thereby to oppose extension of said loop to arrest the aircraft.

7. A combination as set forth in claim 6 in which said cable has two ends, said ends extending tangentially from said drum means and being fixedly anchored adjacent the drum means.

8. A combination as set forth in claim 7 in which said cable is an endless cable whereby the portion of the cable forming said loop may be shifted when worn.

9. A combination as set forth in claim 6 which includes means responsive to rotation of said arms to cause relative axial movement between the arms and said drum means for level winding of the cable on the drum means when the rotation of the arms is reversed to retract said loop.

10. A combination as set forth in claim 9 in which said drum means is screw-threadedly mounted on said shaft means for longitudinal shift thereon in response to rotation thereof.

11. A combination as set forth in claim 6 in which said energy-absorbing means includes means to pump fluid and means to restrict the flow of the pumped fluid.

12. A combination as set forth in claim 11 which includes accumulator means to receive the pumped fluid for storing energy to operate the pump means in reverse for reverse rotation of said arms to retract said loop.

13. A combination as set forth in claim 6 in which the opposite ends of said loop are oppositely wound on said drum means for opposite rotation of said arms for extension of the loop; and in which said pump means comprises a rotary housing operatively connected to one of said arms and a rotor in the housing operatively connected to the other arm.

14. In an apparatus for connection with a vehicle for the transmission of force between the apparatus and the vehicle, the combination of: a cable forming a loop for engagement by the vehicle; a pair of non-rotating drum means to be wound variably with the portions of the cable at the opposite ends of said loop respectively; a pair of arms rotatable co-axially of said pair of drum means respectively adjacent thereto; a pair of tubular shaft means carrying said arms respectively and having two opposite ends to receive respectively the portions of said cable at the two ends of said loop; rotary means to guide said portions of the cable through said pair of tubular shafts respectively to the corresponding arms and to points at the outer ends of the arms overhanging the corresponding drum means whereby extension of the cable loop by an aircraft rotates said pair of arms to unwind the cable from said pair of drum means; and means to control the rotation of said pair of arms thereby to control the size of said loop.

15. A combination as set forth in claim 14 in which said cable is an endless cable with a portion of the cable extending from one of said drums to the other drum whereby the cable may be shifted to change the portion of the cable that forms said loop.

16. In an apparatus to arrest an aircraft or the like, the combination of: a cable forming a loop for engagement by the aircraft; a pair of non-rotating drum means to be wound variably with the portions of the cable at the opposite ends of said loop respectively; a pair of arms rotatable co-axially of said pair of drum means respectively adjacent thereto; a pair of tubular shaft means carrying said arms respectively and having two opposite ends to receive respectively the portions of said cable at the two ends of said loop; rotary means to guide said portions of the cable through said pair of tubular shafts respectively to the corresponding arms and to points at the outer ends of the arms overhanging the corresponding drum means whereby extension of the cable loop rotates said pair of arms to unwind the cable from said pair of drum means and rotation of the pair of arms winds the cable on the drum means to retract the cable loop; and a pair of hydraulic pumps operatively connected to said pair of shafts respectively to absorb energy to resist rotation of said arms and thereby oppose the extension of said loop to arrest the aircraft.

17. A combination as set forth in claim 16 in which said two pumps are interconnected whereby the overloading of one pump relative to the other pump results in the overloaded pump delivering pressurized fluid to the other pump to cause the other pump to function as a fluid motor for winding operation of the corresponding arm.

18. A combination as set forth in claim 16 which includes accumulator means to receive the fluid pumped by said two pumps for storing energy to operate the two pumps in reverse for reverse rotation of said arms to retract the loop.

19. In an apparatus to launch an aircraft or the like, the combination of: a cable forming a normally extended loop to be engaged by the aircraft; a substantially non-rotating drum means to be wound with the cable at the opposite ends of said loop for retracting the loop; a pair of arms rotatable co-axially of said drum means adjacent thereto to wind said portions respectively on the drum means; means to route said cable portions to the region of the axis of rotation of said arms and outward adjacent the arms to points overlying said drum means; and power means to rotate said two arms thereby to contract said loop for launching the aircraft.

20. A combination as set forth in claim 19 in which said power means comprises: an accumulator for storing energy to carry out the launching operation; fluid motor means for actuation by said accumulator to rotate said pair of arms; and pump means to store energy in said accumulator.

21. In an apparatus to launch an aircraft or the like, the combination of: a cable for releasable connection to an aircraft for launching of the aircraft; substantially non-rotating drum means to be wound with said cable; arm means adjacent said drum means to wind the cable on the drum means; means to route said cable to the region of the axis of rotation of said arm means and outward to the region overlying said drum means; and power means to rotate said arm means for winding said cable on the drum means.

22. Means for briefly operatively connecting a moving body to a rotary shaft during a period of changing velocity of the body with consequent transfer of energy between the body and the shaft comprising a substantially non-rotating drum means positioned co-axially of said shaft; arm means fixedly mounted on the shaft for rotation adjacent said drum means; a cable for temporary connection with said moving body; and means to route said cable to the region of the axis of rotation of said arm means and outward to a point on the arm means overhanging the periphery of said drum means and from said point to the drum means whereby rotation of the arm means in one direction winds the cable on the drum means and vice versa.

23. A combination as set forth in claim 22 which includes means to effect relative shift of said point relative to said drum means axially of the drum means for level winding of the cable on the drum means.

24. A combination as set forth in claim 1 in which the means to control the rotation of the two arms comprises: accumulator means; pump means operatively connected to said arms for actuation thereby to pump fluid into said accumulator means to store energy therein, said pump means being reversible to function as a fluid motor; and means to place said accumulator in communication with said pump to operate the pump as a fluid motor for reverse rotation of the two arms.

References Cited in the file of this patent
UNITED STATES PATENTS 2,703,686　　Bell ------------------ Mar. 8, 1955